United States Patent
Voelker (10) Patent No.: US 8,570,209 B2
(45) Date of Patent: Oct. 29, 2013

(54) METHOD FOR OPTIMIZING THE OPERATION OF AN ACTIVE LATERAL-VIEW SENSOR WHEN THE HEIGHT ABOVE THE SURFACE TO BE DETECTED IS VARIABLE

(75) Inventor: Michael Voelker, Immenstaad (DE)

(73) Assignee: Astrium GmbH, Munich (DE)

( * ) Notice: Subject to any disclaimer, the term of this patent is extended or adjusted under 35 U.S.C. 154(b) by 186 days.

(21) Appl. No.: 12/476,904

(22) Filed: Jun. 2, 2009

(65) Prior Publication Data

US 2009/0295625 A1 Dec. 3, 2009

(30) Foreign Application Priority Data

Jun. 3, 2008 (DE) .......................... 10 2008 026 497

(51) Int. Cl.
*G01S 13/90* (2006.01)
(52) U.S. Cl.
USPC ...................................................... 342/25 A
(58) Field of Classification Search
USPC ...................................................... 342/25 A
See application file for complete search history.

(56) References Cited

U.S. PATENT DOCUMENTS

| | | | |
|---|---|---|---|
| 4,280,127 A | | 7/1981 | Lee et al. |
| 5,381,152 A | * | 1/1995 | Klausing ...................... 342/25 F |
| 5,608,404 A | * | 3/1997 | Burns et al. ................. 342/25 A |
| 7,196,653 B2 | * | 3/2007 | Hall et al. .................... 342/25 F |
| 2009/0109086 A1 | | 4/2009 | Krieger et al. |

FOREIGN PATENT DOCUMENTS

| | | |
|---|---|---|
| DE | 10 2006 022 814 A1 | 11/2007 |
| EP | 1 241 487 B1 | 9/2002 |
| WO | WO 2004/104630 A1 | 12/2004 |

OTHER PUBLICATIONS

"RADARSAT Data Products Specifications". RADARSAT International. 125 pages. May 8, 2000. Accessed Jan. 21, 2013. <http://www.hatfieldgroup.com/UserFiles/File/GISRemoteSensing/ResellerInfo/RSat/RADARSAT-1%20Products.pdf>.*
European Search Report dated Sep. 14, 2009 with partial English translation (Twelve (12) pages).
J.C. Henry, "The Lincoln Laboratory 35 GHZ Airborne SAR Imaging Radar System", Proceedings of the National Telesystems Conference, Mar. 26, 1991, pp. 0353-0358, ISBN: 978-0-7803-0062-0, XP-010047053.
William T. K. Johnson, "Magellan Imaging Radar Mission to Venus", Proceedings of the IEEE, Jun. 1, 1991, pp. 777-790, vol. 79, No. 6, New York, USA, ISSN: 0018-9219, XP-000262352.
Jobea Cimino et al., "SIR-B—The Second Shuttle Imaging Radar Experiment", IEEE Transactions on Geoscience and Remote Sensing, Jul. 1986, vol. GE-24, No. 4, ISSN: 0196-2892, XP-011159025.
Frederick Stuhr et al., "SIR-C/X-SAR: An Advanced Radar", Aerospace Applications Conference, Feb. 2, 1996, pp. 5-16, New York, New York, USA, XP-010159025, ISBN: 978-0-7803-3196-9.

(Continued)

*Primary Examiner* — Matthew M Barker
(74) *Attorney, Agent, or Firm* — Crowell & Moring LLP (57) ABSTRACT

A process for optimizing the operation of an active lateral-view sensor when the height above the surface to be detected is variable, includes the following steps: i) continuously determining the height of the lateral-view sensor above the surface to be detected, and ii) adjusting the scanning beams emitted by the lateral-view sensor for scanning the surface to be detected by roll rotation as a function of the determined height of the lateral-view sensor such that variation of the surface to be detected is reduced during the orbit of the lateral-view sensor.

9 Claims, 6 Drawing Sheets

(56) References Cited

OTHER PUBLICATIONS

Jeffrey E. Hilland et al., "Future NASA Spaceborne SAR Missions", IEEE AES Systems Magazine, Nov. 1998, pp. 9-16.

Marina V. Dragošević et al., "Doppler Tracker for a Spaceborne ScanSAR System", IEEE Transactions on Aerospace and Electronic Systems, vol. 36, No. 3, Jul. 2000, pp. 907-924.

Stefan Ochs et al., "The TerraSAR-X and TanDEM-X Satellites", EADS Astrium GmbH, IEEE 2007, pp. 294-298.

* cited by examiner

METHOD FOR OPTIMIZING THE OPERATION OF AN ACTIVE LATERAL-VIEW SENSOR WHEN THE HEIGHT ABOVE THE SURFACE TO BE DETECTED IS VARIABLE

BACKGROUND AND SUMMARY OF THE INVENTION

This application claims the priority of German patent document 10 2008 026 497.0-55, filed Jun. 3, 2008, the disclosure of which is expressly incorporated by reference herein.

The invention relates to a process for operating an active lateral-view sensor when its height above the surface to be detected is variable.

Active lateral-view sensors or lateral-view instruments use RADAR (Radio Wave Detection and Ranging) or LIDAR (Light Wave Range and Detection) to measure the interval between transmission and echo return. They are used by satellites, for example, to survey and image the earth's surface. One example of an active lateral-view sensor is the Synthetic Aperture Radar (SAR) System, which is also called lateral-view radar. In such SAR Systems, alternately, i) pulse signals are emitted at defined time intervals by way of a short antenna that is moved in the direction of the surface to be detected, and ii) the echo signals (and thus the pulse signals reflected at the scanned objects) are received. For each region covered and scanned by the antenna, a SAR processor computes an image of the scanned object by a corresponding data processing of the echo signals.

Figure 1:
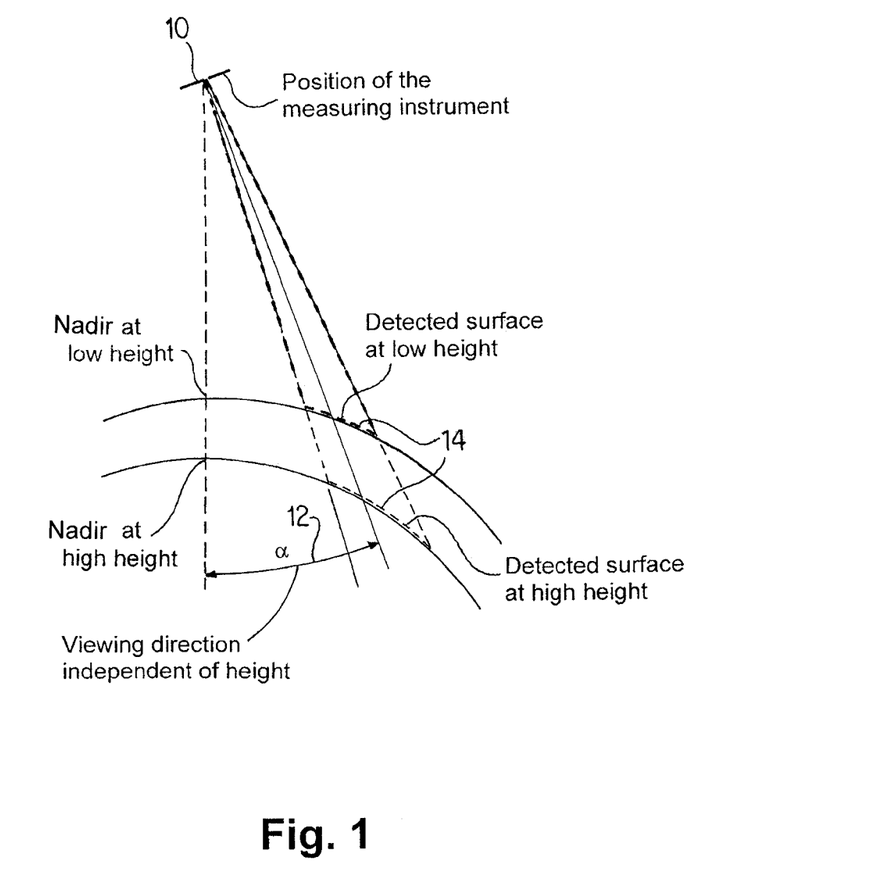
FIG. 1 is a view of a lateral-view sensor which scans the surface of a celestial body and the surface detected by the sensor at two different heights.

By means of their emitted pulse signals, lateral-view sensors, such as SAR systems cover a region or swath of a surface to be detected or surveyed (or of an atmospheric volume) abreast of the flight direction, and receive echo signals from this region or swath of a surface to be detected or surveyed abreast of the flight direction. The viewing direction of the sensor, (i.e., the direction of the emitted pulse signals, or scanning beams), normally remains the same—for example, according to an orientation relative to the flight direction and nadir direction. Even when various swaths are defined (angle-of-view regions), which can be selected at random (for example, by means of a phased RADAR antenna), the orientation of each swath itself remains the same during the entire orbit of the sensor around the celestial body that is to be surveyed. However, on elliptical paths and around non-spherical-symmetrical celestial bodies, the distance varies between a lateral-view sensor and the surface that is to be detected, as illustrated in FIG. 1.

The time behavior during a recording or scanning therefore depends considerably on the height (altitude) above the measured surface and on the region to be detected. If, for example, an active lateral-view sensor is operated such that, alternately, pulse signals can be emitted and echo signals can be received only during the non transmission intervals, the pulse repetition frequency (PRF) (the frequency of the emission of pulsed signals) must be adapted continuously, which increases considerably the complexity of the control of the scanning. In an access range to be detected, with, for example, an angle of incidence of from 20° to 55° between the scanning beams emitted by a lateral-view sensor and the surface to be surveyed, there are a number of overlapping individually selectable swaths whose orientation with respect to the angle of incidence or angle of view remains similar during the entire orbit. The values of the PRF that are possible based on the signal propagation time vary during the orbit. A fixed PRF for each swath is often not possible.

Therefore, one object of the present invention is to provide a process for optimizing the operation of an active lateral-view sensor when the height above the surface to be detected is variable.

This and other objects and advantages are achieved by the method according to the invention, in which the scanning beams emitted by the lateral-view sensor for scanning a surface to be detected are adjusted as a function of the determined height of the sensor, by means of a roll rotation such that the variation of the surface to be detected is reduced during the orbit of the lateral-view sensor. In other words, the present invention uses a roll steering rule for aligning the antenna of a lateral-view sensor to define a swath of a surface to be detected that is to be covered. As a result, in contrast to a rigid antenna alignment, the lateral-view sensor can be operated at a constant PRF during longer sections in the orbit; and its operation can therefore be optimized with respect to the complexity of the control of the scanning of the surface to be detected. Furthermore, one antenna beam per swath to be scanned of the surface to be detected may be sufficient during the entire orbit of the lateral-view sensor.

According to one embodiment, the invention provides a process for optimizing the operation of an active lateral-view sensor when the height above the surface to be detected is variable, which has the following steps:

Continuous determination of the height of the lateral-view sensor above the surface to be detected, and adjusting the scanning beams emitted by the lateral-view sensor for scanning the surface to be detected by roll rotating (roll steering rule) as a function of the determined height of the lateral-view sensor, such that a variation of the surface to be detected is reduced during the orbit of the lateral-view sensor. This arrangement simplifies control of the scanning of the surface to be detected by operation with a constant PRF during longer sections of the orbit of the lateral-view sensor as an optimization according to this embodiment of the invention.

According to an embodiment of the invention, the adjustment by roll rotating may comprise a mechanical rotation of the lateral-view sensor.

In an embodiment of the invention, as an alternative or in addition, the adjustment by roll rotating may comprise an electronic roll rotation of the emitted scanning beams, by a corresponding control of an antenna of the lateral-view sensor.

According to an embodiment of the invention, the adjustment by roll rotation may comprise a swiveling of the direction detected by the lateral-view sensor as a function of the surface to be detected.

According to another embodiment of the invention, the adjustment by roll rotation may comprise maintaining a fixed distance between the lateral-view sensor and the detected surface.

Furthermore, according to an embodiment of the invention, the adjustment by roll rotation may comprise maintaining a fixed width of a swath of the surface to be detected that is covered by the lateral-view sensor.

Furthermore, according to an embodiment of the invention, the adjustment by roll rotation may comprise variation, during the orbit of the lateral-view sensor, of an angle of view that all swaths in the access range covered by the lateral-view sensor have in common.

Furthermore, according to an embodiment of the invention, the orientation of the lateral-view sensor corresponding to its orbital position can be adapted by yawing and pitching, such that a zero Doppler recording geometry is ensured over the entire access range of the lateral-view sensor.

In another embodiment, the invention relates to a system for optimizing the operation of an active lateral-view sensor while the height above the surface to be detected is variable, the system for implementing a process according to the invention being constructed as explained above and having the following:

First devices for the continuously determining the height of the lateral-view sensor above the surface to the detected, and second devices for adjusting the scanning beams emitted by the lateral view sensor for scanning the surface to be detected by roll rotating such that a variation of the surface to be detected is reduced during the orbit of the lateral-view sensor. The system may, for example, be constructed as a module that can be integrated in a satellite.

Finally, according to an embodiment, the invention relates to a lateral-view sensor, for example, a SAR system which includes a system according to the invention, as explained above.

Other objects, advantages and novel features of the present invention will become apparent from the following detailed description of the invention when considered in conjunction with the accompanying drawings.

BRIEF DESCRIPTION OF THE DRAWINGS

The terms used in the list of reference symbols indicated below and the assigned reference symbols are used in the specification, in the claims, in the abstract and in the drawings.

DETAILED DESCRIPTION OF THE DRAWINGS

In the following, identical and/or functionally identical elements may be provided with the same reference symbols.

FIG. 1 illustrates a SAR system or a SAR satellite 10 as an example of a lateral-view sensor which is provided as a measuring instrument for scanning the surface of a celestial body 12. The surface of the celestial body 12 detected by the sensor 10 is illustrated at two different heights, specifically a low and a high height of the sensor above the surface. In this case, the viewing direction of the sensor 10 (that is, the direction of the scanning or antenna beams emitted by the antenna of the SAR satellite) is independent of the height. The viewing direction can be indicated by way of the angle of view a (i.e., the angle between the principal direction of the antenna beams and the nadir).

In contrast, the region 14 on the surface of the celestial body 12 to be covered by the scanning or antenna beams and to be detected by the sensor 10 (the slant range interval of a swath to be detected) is dependent on the height. The swath 14 covered by the sensor 10 on the surface of the celestial body 12 therefore varies with the distance of the sensor 10 from the surface, which distance, in turn, depends on the orbit of the sensor 10. On elliptical paths and around non-spherical-symmetrical celestial bodies, the variation may be considerable. For example, because of the flattening of the earth, the variation may amount to approximately 28 km in the case of sun-synchronized polar earth-synchronous orbits. Such distance variations normally cause a variation of the PRF, and therefore require a high-expenditure control of the scanning.

The orientation of a SAR satellite 10 can be adapted according to a yaw and pitch steering rule corresponding to its orbit position, so that a "zero-Doppler recording geometry" can be ensured during the entire access range. This is advantageous for the SAR processing (i.e., the processing of the echo signals received from the SAR satellite 10).

In order to reduce the variation of the slant range interval of a swath 14 to be detected by the SAR satellite 10 during the orbit, according to the invention, a mechanical (or electronic) roll rotation (roll steering rule) of the used antenna beams can be implemented as a function of the height of the SAR satellite above the surface. If required, this roll rotation additionally permits movement about the other axes in order to achieve the "zero-Doppler recording geometry", as described above.

Figure 2A:
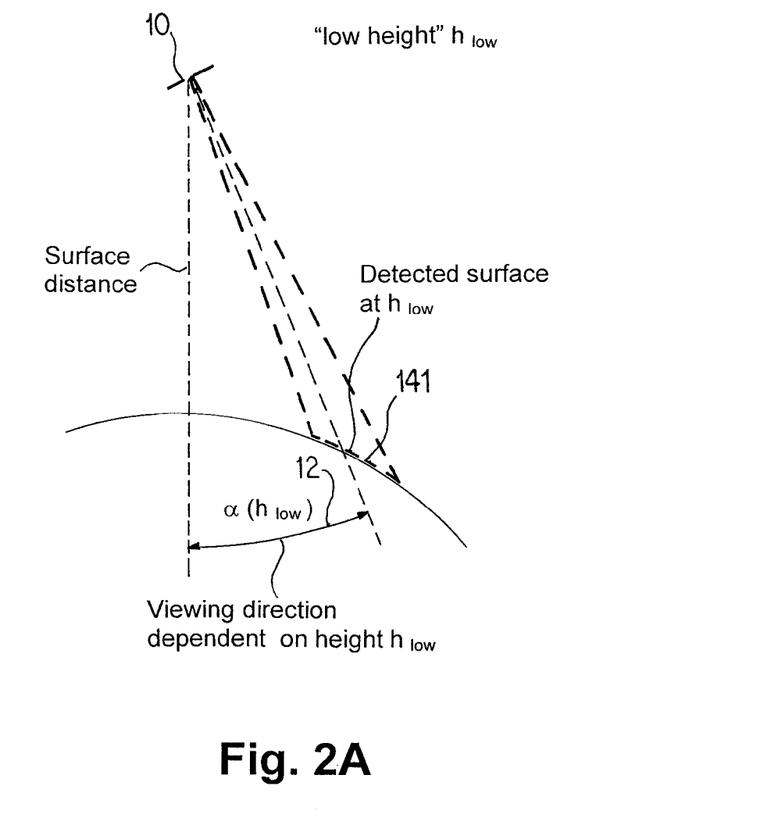
FIGS. 2A and 2B are views of two different roll orientations of a lateral-view sensor for two different heights at different positions during the orbit of the sensor above the surface to be detected.
Figure 2B:
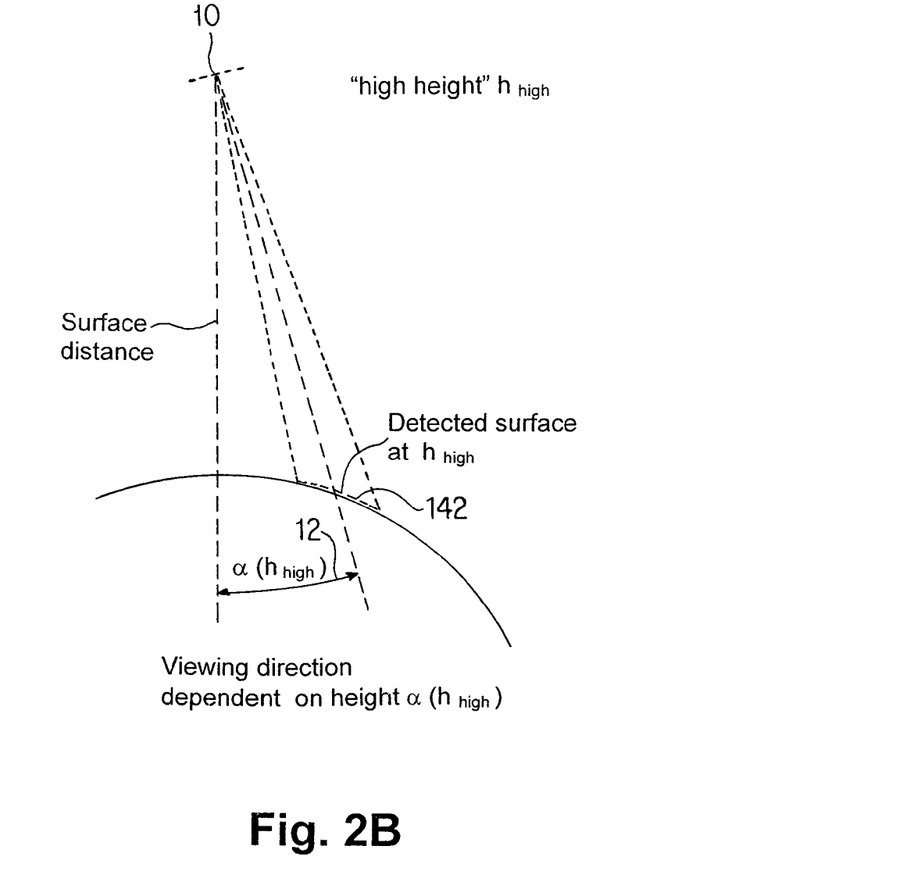

FIG. 2 illustrates different roll orientations of the antenna beams for two different heights (at different positions during the orbit) of the SAR satellite 10 above the measured surface of the celestial body 12. FIG. 2A illustrates a roll orientation at a "low" height $h_{low}$ of the measuring instrument or SAR satellite above the detected surface; FIG. 2B illustrates a roll orientation at a "high" height $h_{high}$. The slant range interval of a swath detected in the case of the two different roll rotations has reference numbers 141 and 142 respectively.

In contrast to the situation illustrated in FIG. 1, in which no roll orientation of the antenna beams was carried out, the angles of view $\alpha(h_{low})$ and $\alpha(h_{high})$ of the SAR satellite 10 are now different as a result of the differing roll orientations of the antenna beams in the two situations, and depend on the height of the SAR satellite above the detected surface. The roll rotation of the antenna beams can be achieved by a mechanical rotation of the entire satellite (roll steering rule) and/or by a swath-dependent additional swiveling of the direction detected by the instrument. The nominal orientation of the covered swath will move corresponding to the range covered by the measuring instrument (aperture or antenna).

Figure 3A:
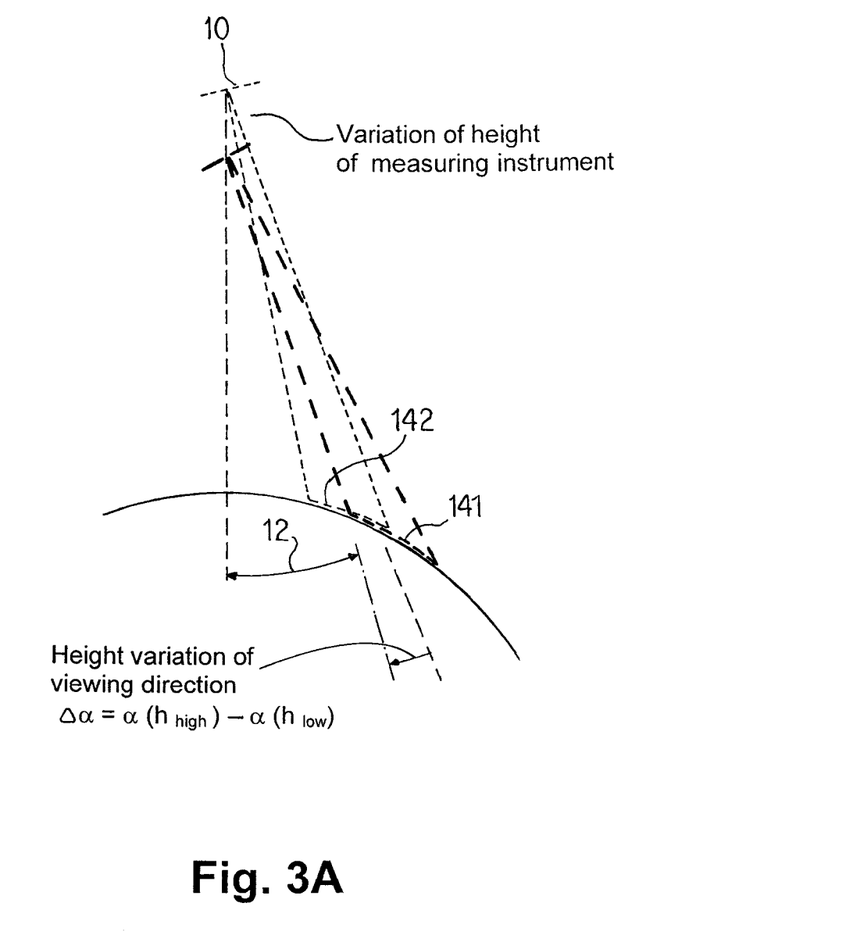
FIGS. 3A and 3B are views of a superimposition of the measuring situations illustrated in FIGS. 2A and 2B in the case of a different vertical reference.
Figure 3B:
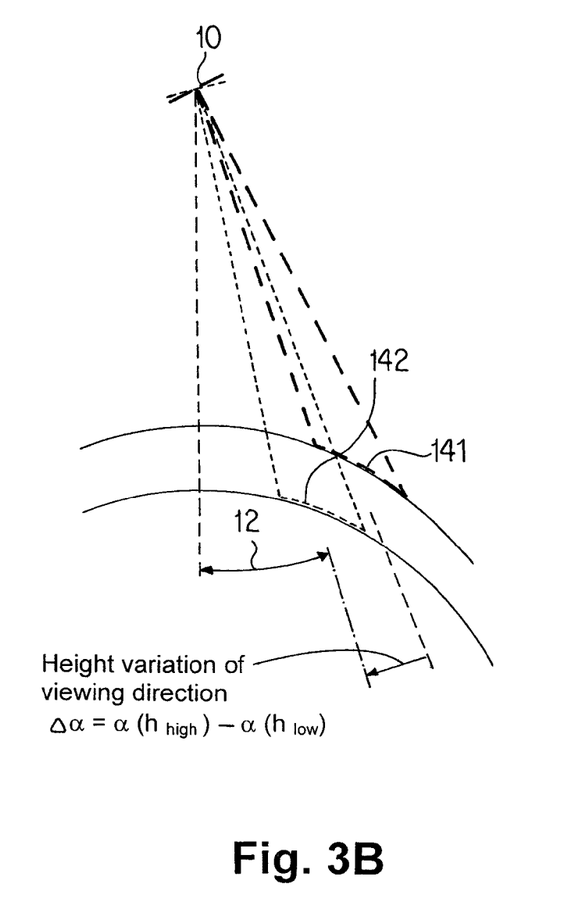

The dependence of the angles of view $\alpha$ on the height above the measured surface is regulated by a control implemented in the SAR satellite 10, such that a variation of the slant range intervals of a swath 141 and 142 detected by the two different angles of view is as small as possible. Thus, the PRF can remain almost constant during longer sections of the path of the SAR satellite 10. FIG. 3 shows a superimposition of the two representations of FIG. 2 when the vertical reference is different: In FIG. 3A, the measured surface is fixed; and in FIG. 3B, the position of the measuring instrument is fixed.

The change of the angle of view of the SAR satellite 10 during the orbit can be optimized according to the following criteria used as examples:

1. Maintaining a fixed distance between the measuring instrument and the detected surface, which would require the largest variation of the angle of view. Smaller variations of the angle of view reduce at least the distance variations.
2. Maintaining a fixed width of the covered swath, which can be achieved by smaller variations of the angle of view.
3. Variation of the angle of view during the orbit which all swaths in the access range have in common can be implemented mechanically by a roll steering rule. An adaptation of the amount of the variation to an optimal correction in the case of the most critical swath (for example, according to Points 1. and 2.) often is a good compromise.

Figure 4:
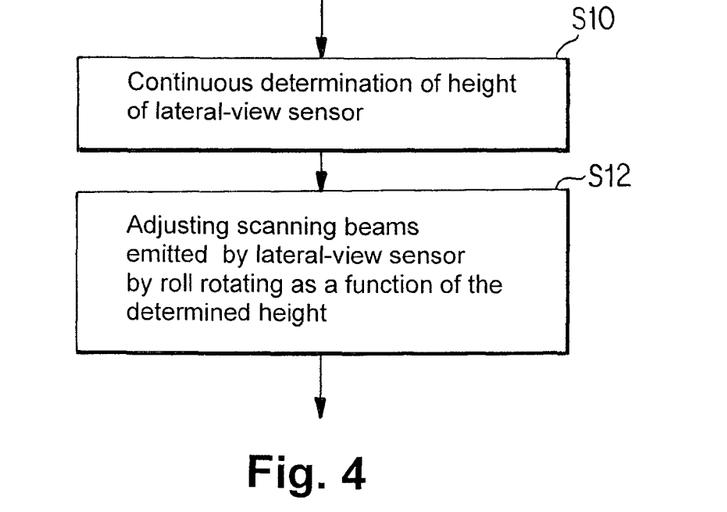
FIG. 4 is a flow chart of an embodiment of a process for optimizing the operation of an active lateral-view sensor when the height above the surface to be detected is variable.

FIG. 4 is a flow chart which illustrates the steps that can be carried out, for example, by a control implemented in the SAR satellite 10, and which makes it possible to optimize the operation of the SAR satellite 10 to achieve a PRF that is as constant as possible. In a first step S10 of the algorithm, the height of the SAR satellite 10 above the surface of the celestial body 12 to be detected is continuously determined. In a subsequent Step S12, the scanning beams emitted by the SAR satellite 10 for scanning the surface to be detected are then adjusted by roll rotation as a function of the determined height of the lateral-view sensor, such that a variation of the surface to be detected is reduced during the orbit of the lateral-view sensor. For a given angle of view, this can be achieved by computing the size of a detected slant range interval of a swath as a function of the determined height, and changing the angle of view as a function of the height such that the slant range interval of a swath detected by the changed angle of view has a size that corresponds approximately to the size computed for the determined angle of view.

Figure 5:
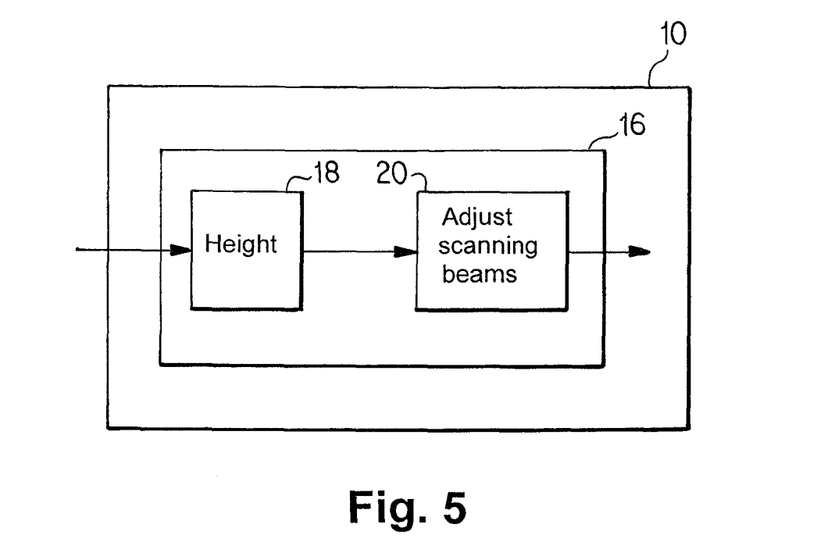
FIG. 5 is a very simplified block diagram of an active lateral-view sensor with a system according to the invention for optimizing the operation of the active lateral-view sensor when the height above the surface to be detected is variable.

FIG. 5 is a simplified block diagram of a system 16 for optimizing the operation of an active lateral-view sensor, which system 16 may be constructed, for example, as a module and may be implemented in a SAR satellite 10. The system 16 has first devices 18 which continuously determine the height of the lateral-view sensor above the surface to be detected, and second devices 20 which adjust the scanning beams emitted by the lateral-view sensor for scanning the surface to be detected, by roll rotating as a function of the determined height of the lateral-view sensor, such that a variation of the surface to be detected is reduced during the orbit of the lateral-view sensor. The devices 18 and 20 may be implemented either as hardware or software or at least partially as hardware or software. They may be implemented, for example, by a processor having a memory in which the method shown in FIG. 4 is filed in the form of a program that can be executed by the processor.

Compared with a fixed orientation of an antenna, the defining of the swaths to be covered based on a roll steering rule according to the invention permits particularly the following:

Longer sections in the orbit can be operated at a constant PRF: In the example of Sentinel-1, it is even constant during the entire orbit for almost all swaths. Furthermore, the complexity of the control/programming is reduced.

It may be sufficient to use one and the same configuration of the measuring instrument (antenna beam) per swath during the entire orbit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SYMBOLS

10 Lateral-view sensor
12 Celestial body
14 Slant range interval of a swath
141 Slant range interval of a swath
142 Slant range interval of a swath
16 System for optimizing the operation of an active lateral-view sensor
18 First devices of system 16
20 Second devices of system 16
S10-S12 Process Steps

What is claimed is:

1. A process for operation of an active lateral-view sensor whose height above a surface to be detected is variable; said process comprising:
determining, as a function of height, a size of a slant range interval of a swath on a surface that is to be detected for a particular angle of view;
continuously determining a height of the sensor above the surface that is to be detected; and
adjusting, within the swath to be detected, an angle of view of scanning beams emitted by the sensor for scanning said surface, wherein said step of adjusting the angle of view fixes the size of the slant range interval by roll rotation of the sensor as a function of the determined height of the sensor during an entire orbit of the lateral-view sensor, the fixed size of the slant range interval corresponding approximately to the determined size of the slant range interval of the swath.

2. The process according to claim 1, wherein the adjusting by roll rotation comprises a mechanical rotation of the sensor.

3. The process according to claim 1, wherein the adjusting by roll rotation comprises an electronic roll rotation of the emitted scanning beams by a corresponding control of an antenna of the sensor.

4. The process according to claim 1, wherein the adjusting by roll rotation comprises a swiveling of a direction detected by the sensor as a function of the surface to be detected.

5. The process according to claim 1, wherein the roll rotation is adjusted so as to maintain a fixed distance between the sensor and said surface.

6. The process according to claim 1, wherein the roll rotation is adjusted so as to maintain a fixed width of a swath of said surface that is covered by the sensor.

7. The process according to claim 1, wherein an orientation of the sensor is adapted corresponding to its orbital position, by yawing and pitching, to maintain a zero-Doppler recording geometry as between the sensor and the swath that is detected.

8. A process for operation of an active lateral-view sensor whose height above a surface to be detected is variable; said process comprising:
determining, as a function of height, a size of a slant range interval of a swath on a surface that is to be detected for a particular angle of view;
continuously determining a height of the sensor above the surface that is to be detected;
adjusting, within the swath to be detected, an angle of view of scanning beams emitted by the sensor for scanning said surface, wherein said step of adjusting the angle of view fixes the size of the slant range interval by roll rotation of the sensor as a function of the determined height of the sensor during an entire orbit of the lateral-view sensor, the fixed size of the slant range interval corresponding approximately to the determined size of the slant range interval of the swath; and operating the sensor using a constant pulse repetition frequency during the entire orbit.

9. A process for operation of an active lateral-view sensor whose height above a surface to be detected is variable; said process comprising:

determining, as a function of height, a size of a slant range interval of a swath on a surface that is to be detected for a particular angle of view;

continuously determining a height of the sensor above the surface that is to be detected; and adjusting, within the swath to be detected, an angle of view of at least one scanning beam emitted by the sensor for scanning said surface, wherein said step of adjusting the angle of view fixes the size of the slant range interval by roll rotation of the sensor as a function of the determined height of the sensor during an entire orbit of the lateral-view sensor, the fixed size of the slant range interval corresponding approximately to the determined size of the slant range interval of the swath; and scanning the surface to be detected using a single antenna beam per swath during the entire orbit.

* * * * *